(12) United States Patent
Bezalel et al.

(10) Patent No.: US 10,990,363 B2
(45) Date of Patent: Apr. 27, 2021

(54) CLASSIFICATION MODELS FOR BINARY CODE DATA

(71) Applicant: ENTIT SOFTWARE LLC, Sanford, NC (US)

(72) Inventors: Amit Bezalel, Yehud (IL); Amir Wigelman, Yehud (IL); Roman Gelfand, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 15/774,819

(22) PCT Filed: Nov. 12, 2015

(86) PCT No.: PCT/US2015/060333
§ 371 (c)(1),
(2) Date: May 9, 2018

(87) PCT Pub. No.: WO2017/082906
PCT Pub. Date: May 18, 2017

(65) Prior Publication Data
US 2018/0321924 A1    Nov. 8, 2018

(51) Int. Cl.
| | |
|---|---|
| *G06F 9/44* | (2018.01) |
| *G06F 8/41* | (2018.01) |
| *G06N 20/00* | (2019.01) |
| *G06F 8/35* | (2018.01) |
| *G06F 8/654* | (2018.01) |
| *G06N 20/10* | (2019.01) |
| *G06F 8/65* | (2018.01) |

(52) U.S. Cl.
CPC ............. *G06F 8/43* (2013.01); *G06F 8/35* (2013.01); *G06F 8/65* (2013.01); *G06F 8/654* (2018.02); *G06N 20/00* (2019.01); *G06N 20/10* (2019.01)

(58) Field of Classification Search
CPC .... G06F 11/3668; G06F 11/3604; G06F 8/35; G06F 8/43; G06F 8/65; G06F 8/654; G06F 20/00; G06F 20/10
See application file for complete search history.

(56) References Cited

U.S. PATENT DOCUMENTS

| | | |
|---|---|---|
| 6,594,822 B1 | 7/2003 | Schweitz |
| 6,748,584 B1 | 6/2004 | Witchel et al. |
| 8,397,230 B2 | 3/2013 | Ewington et al. |
| 8,468,516 B1 | 6/2013 | Chen et al. |

(Continued)

FOREIGN PATENT DOCUMENTS

EP    1855197 A1    11/2007

OTHER PUBLICATIONS

Indigo Rose Software, Binary Differencing Compression = Tiny Patches, Retrieved from the Internet: [retrieved on Aug. 20, 2015], 3 pages.

(Continued)

*Primary Examiner* — Hang Pan
*Assistant Examiner* — Lenin Paulino (57) ABSTRACT

Examples disclosed herein relate to classification models for binary code data. Some of the examples enable obtaining changed binary code data and unchanged binary code data, and generating, using a machine-leaning algorithm, a classification model based on training data that comprises the changed binary code data and the unchanged binary code data.

15 Claims, 5 Drawing Sheets

(56) References Cited

U.S. PATENT DOCUMENTS

| | | | |
|---|---|---|---|
| 8,630,981 B1 | 1/2014 | Chirhart et al. | |
| 8,826,439 B1* | 9/2014 | Hu | G06F 21/563 |
| | | | 726/24 |
| 9,501,749 B1* | 11/2016 | Narsky | G06N 7/023 |
| 2004/0107416 A1 | 6/2004 | Buban | |
| 2005/0188259 A1 | 8/2005 | Zweifel | |
| 2006/0112152 A1 | 5/2006 | Napier | |
| 2010/0138389 A1* | 6/2010 | Snapp | G06F 16/27 |
| | | | 707/638 |
| 2010/0235823 A1* | 9/2010 | Garbers | G06F 8/71 |
| | | | 717/170 |
| 2010/0274765 A1* | 10/2010 | Murphy | G06F 11/3034 |
| | | | 707/652 |
| 2012/0079452 A1* | 3/2012 | Nir-Buchbinder | G06F 8/33 |
| | | | 717/113 |
| 2015/0091790 A1* | 4/2015 | Forutanpour | G06F 3/015 |
| | | | 345/156 |
| 2017/0123963 A1* | 5/2017 | Koren | G06F 11/3668 |

OTHER PUBLICATIONS

International Searching Authority, International Search Report and Written Opinion dated Jul. 26, 2016 for PCT Application No. PCT/US2015/060333 Filed Nov. 12, 2015, 9 pages.

The Chromium Projects, How Courgette Works, Retrieved from the Internet: [retrieved on Aug. 20, 2015], 4 pages.

* cited by examiner

CLASSIFICATION MODELS FOR BINARY CODE DATA

BACKGROUND

Source code represents any collection of computer instructions written in a human-readable computer language such as text that can be easily written and understood by a human. Software developers may develop a software program by writing source code which specifies the actions to be performed by a computer. The source code may then be transformed by a compiler program into low-level machine code (e.g., binary code) understood by the computer.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Source code represents a set of computer instructions written in a human-readable computer language such as text that can be easily written and understood by a human. Software developers may develop a software program by writing source code which specifies the actions to be performed by a computer. The source code may then be transformed by a compiler program into low-level machine code (e.g., binary code) that is understood and ready to be executed by the computer.

After a release of a software program, software patches may be subsequently distributed to update the program or any of its supporting data to fix or improve the usability or performance of the program. Developers may make changes to the source code and the changes in the source code may be distributed as a patch. In one example, a patch may include the changes in the form of source code. In this case, once the patch is received by a user, the source code in the patch needs to be compiled first by a compiler program to be executed by the computer. In another example, a patch can include the changes in the form of binary code (e.g., executable files). This type of patch allows users to simply run the patch to apply the modifications to the program (e.g., by modifying the binary code data of the installed program, or by completely replacing the program) without having to compile the source code themselves.

Creation of a binary-code patch may require tracking the changes made to the source code and determining which binary code files have been affected by the source code changes. This way of patch creation may require gathering input from a large number of developers about the changes they made to the source code. This is a very time-consuming process for large scale software companies. Moreover, the patch creation may require packaging any binary code file that is suspected of being affected by the source code changes because a changed file, if missing from the patch, would prevent the patch from being properly installed on a client device. This means that the size of the resulting patch could be as large as the original program. Large patches are slow to install on the client device, causing lengthy system downtime and affecting the overall performance of the system.

Examples disclosed herein provide technical solutions to these technical challenges by generating a classification model for binary code data. For example, the classification model may determine whether it is likely that a particular binary code file has been affected by changes made to a corresponding source code file. In this example, if determined that it is likely, that binary code file may be included in a software patch. This may help eliminate the need to track individual changes made to the source code and/or may help reduce the size of the resulting patch by correctly identifying the binary code files that have been affected by the source code changes.

Some of the examples disclosed herein enable obtaining changed binary code data comprising a first set of binary code data that is produced by a first software code build of a first set of source code, and a second set of binary code data from a second software code build of a second set of source code, and obtaining unchanged binary data comprising a third set of binary code data that is produced by a third software code build of a third set of source code, and a fourth set of binary code data that is produced by a fourth software code build of the third set of source code. Some of the examples further enable generating, using a machine-learning algorithm, a classification model based on training data that comprises the changed binary code data and the unchanged binary code data.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
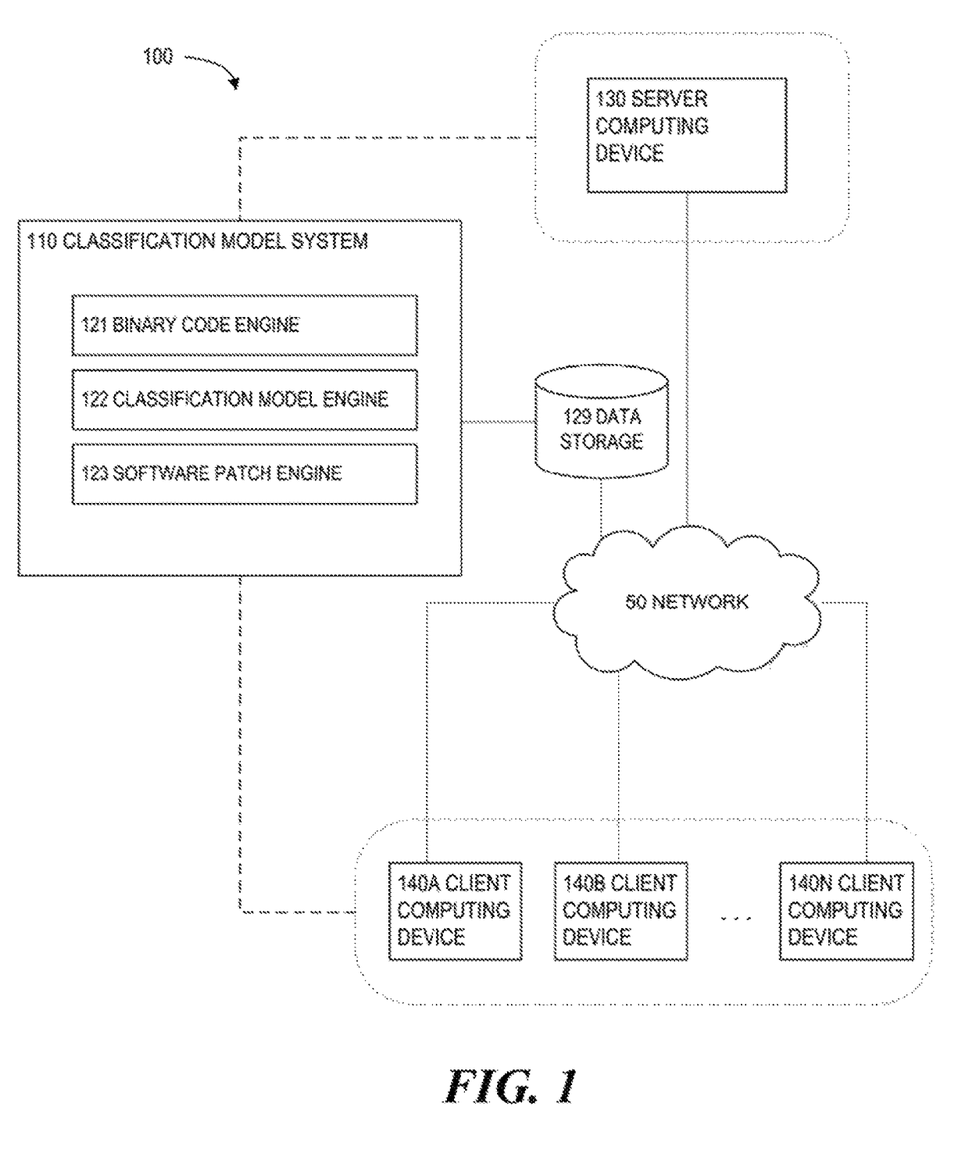
FIG. 1 is a block diagram depicting an example environment in which various examples may be implemented as a classification model system.

FIG. 1 is an example environment 100 in which various examples may be implemented as a classification model system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, classification model system 110 and the various components described herein may be implemented in hardware and/or a combination of hardware and programming that configures hardware. Furthermore, in FIG. 1 and other Figures described herein, different numbers of components or entities than depicted may be used.

Classification model system 110 may comprise a binary code engine 121, a classification model engine 122, a software patch engine 123, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Binary code engine 121 may obtain changed binary code data and unchanged binary code data. The changed and unchanged binary code data may be used as training data to train a classification model as further discussed herein with respect to classification model engine 122. For example, the changed binary code data may include a binary code file that has been produced by compiling a source code file that is known to be changed from its prior version of the source code file, and the unchanged binary code data may include a binary code file that has been produced by compiling a source code file that is known to be unchanged (and/or a substantially identical source code file) from its prior version of the source code file.

In some implementations, the changed binary code data may comprise a first set of binary code data that is produced by a first software code build of a first set of source code. For example, the first set of source code may include an old version of a particular source code file. The first set of source code may be compiled by a compiler program to produce the first set of binary code data (e.g., a first binary code file produced by compiling the old version of the particular source code file). This compilation of the first set of source code may be considered as the first software code build (e.g., having a first build number).

The changed binary code data may further comprise a second set of binary code data that is produced by a second software code build of a second set of source code. The second set of source code may include a new version of the particular source code file. In this example, a developer may make some changes to the old version of the particular source code file to create the new version of the source code file. Thus, the second set of source code may include at least a portion that is different from the first set of source code. The second set of source code may be compiled by the compiler program to produce the second set of binary code data (e.g., a second binary code file produced by compiling the new version of the particular source code file). This compilation of the second set of source code may be considered as the second software code build (e.g., having a second build number).

In some implementations, the changed binary code data may include a pair of binary code files. For example, the changed binary code data may comprise a pair of a first binary code file from the first set of binary code data and a second binary code file from the second set of binary code data. In some implementations, the changed binary code data may include multiple pairs of binary code files. In other words, the first set of source code may include a first set of source code files, which may be compiled into a first set of binary code files. Similarly, the second set of source code may include a second set of source code files, which may be compiled into a second set of binary code files. Each binary code file of the first set of binary code files may have a corresponding binary code file in the second set of binary code files, creating a pair of binary code files.

The unchanged binary code data may be produced in a similar manner as the changed binary code data as described above, but the unchanged binary code data may include, for example, a pair of binary code files that are produced by compiling an identical (and/or substantially identical) source code file (e.g., the same version of a particular source code) at different times. In other words, the identical source code file (e.g., that is known to be unchanged) may be compiled during one software code build to produce a binary code file and compiled again during a subsequent software code build to produce another binary code file. These two binary code files produced by two different compilations (and/or builds) may make up a pair of binary code files to be included in the unchanged binary code data. In some implementations, the unchanged binary code data may include multiple pairs of binary code files.

Classification model engine 122 may generate, using a machine-learning algorithm, a classification model based on training data that comprises the changed binary code data and the unchanged binary code data. The training data may be obtained by binary code engine 121, as discussed herein. Any machine-learning algorithm known in the art may be used to generate the classification model. One example of such machine-learning algorithm may include a support vector machine (SVM) algorithm that is generally used for classification and regression analysis. The SVM algorithm builds a classification model based on training data that includes two types of data, each marked for belonging to one of two classification groups. The classification model may then assign new data into one group or the other, making it a non-probabilistic binary linear classifier.

For example, the classification model generated using a SVM algorithm may be a representation of the training data as points in a dimensional space (e.g., vectors in a vector space) such that the points of the separate classification groups are divided by a clear gap (e.g., a hyperplane or set of hyperplanes). New data to be classified may then be placed onto the same space and predicted to belong to a classification group based on which side of the gap it falls on.

Classification model engine 122 may obtain a pair of binary code files to be classified (e.g., new data that is yet to be classified) using the generated classification model. The classification model may determine whether the pair of binary code files is classified into a first classification group that includes the changed binary code data (e.g., the first classification group that the changed binary code data belongs to) or a second classification group that includes the unchanged binary code data (e.g., the second classification group that the unchanged binary code data belongs to). In doing so, classification model engine 122 may compare one file of the pair with the other file of the pair and/or generate a particular vector to be placed in a vector space of the classification model. The particular vector, as described herein, may represent a result of this comparison. For example, the difference between the pair of binary code files may converted into and/or be represented by the particular vector.

In some implementations, the vector may be normalized because different pairs of binary code files may have different file sizes. In this way, all of the vectors can have a uniform size across the vector space regardless of the actual size of binary code files they represent. For example, assuming that a pair of binary code files includes a first binary code file and a second binary code file that corresponds to the first binary code file. Each of the binary code files may comprise a predetermined number of sections of equal byte size. For each section of the second binary code file, classification model engine 122 may identify a portion that is different from the first binary code file, and may determine a byte size of the portion that is different from the first binary code file. The determined byte size may be compared to a total byte size of the each section to determine a percentage of the determined byte size in the total byte size of the each section. For example, each of the binary code files is divided into 3 section of equal byte size. If the first section has 5% change (e.g., 5% of the section has changed compared to the total byte size of the section), a second section has 5% change, and a third section has 20% change, the normalized vector may equate to 10% (e.g., an average for the three sections) per section. The above example is provided as illustrative purposes, and thus any other normalization technique may be implemented by classification model 122.

The particular vector (and/or normalized vector) may then be placed in the vector space in which the changed binary code data and the unchanged binary code data are divided by a gap or hyperplane. If the particular vector (and/or normalized vector) falls on one side of the gap in which the changed binary code data belongs to, classification model engine 122 may classify the pair of binary code files into the first classification group. On the other hand, if the particular vector (and/or normalized vector) falls on the other side of the gap in which the unchanged binary code data belongs to, classification model engine 122 may classify the pair binary code files into the second classification group.

In some implementations, classification model engine 122 may change the classification of the pair of binary code files from the second classification group (e.g., unchanged binary code data) to the first classification group (e.g., changed binary code data) based on a level of confidence (e.g., that the classification model has) in classifying the pair of binary files into the second classification group. If the confidence level is too low, for example, the classification may be changed to the first classification group because the effect of omitting a necessary file from the patch could be more detrimental that the effect of adding an additional file to the patch. In doing so, classification model engine 122 may compare the confidence level with a threshold level. In response to determining that the confidence level is lower than or below the threshold level, classification model engine 122 may classify the pair of binary files into the first classification group.

Software patch engine 123 may create a patch to a software program. In response to determining that the pair of binary code files is classified into the first classification group (e.g., changed binary code data), software patch engine 123 may determine that one binary code file of the pair includes at least a portion that is different from the other binary code file of the pair. Software patch engine 123 may include an entire binary code file that was classified into the first classification group or a portion of the binary code file (e.g., the portion of one binary code file that is different from the other binary code file of the pair). The patch may include a plurality of binary code files (and/or portions thereof) that have been classified into the first classification group.

In performing their respective functions, engines 121-123 may access data storage 129 and/or other suitable database(s). Data storage 129 may represent any memory accessible to classification model system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Classification model system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
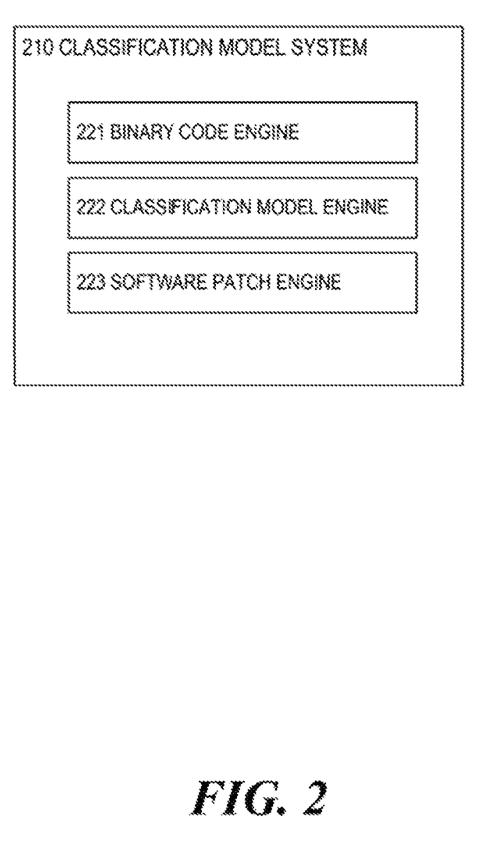
FIG. 2 is a block diagram depicting an example classification model system.

FIG. 2 is a block diagram depicting an example classification model system 210. Classification model system 210 may comprise a binary code engine 221, a classification model engine 222, a software patch engine 223, and/or other engines. Engines 221-223 represent engines 121-123, respectively.

Figure 3:
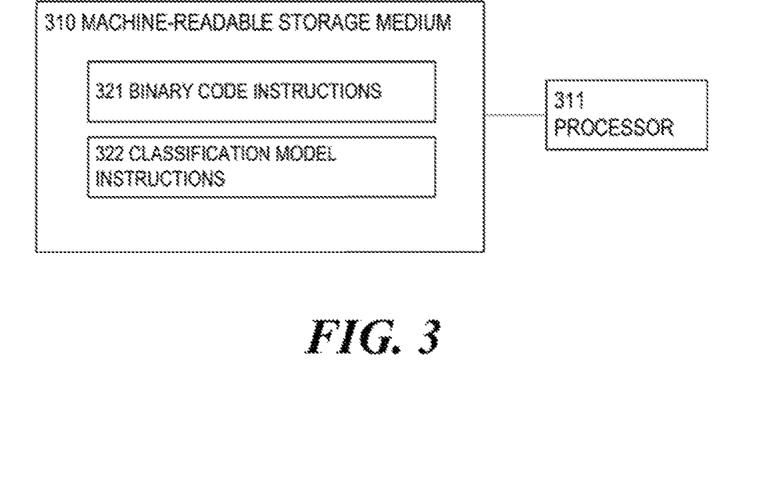
FIG. 3 is a block diagram depicting an example machine-readable storage medium comprising instructions executable by a processor for generating a classification model for binary code data.

FIG. 3 is a block diagram depicting an example machine-readable storage medium 310 comprising instructions executable by a processor for generating a classification model for binary code data.

In the foregoing discussion, engines 121-123 were described as combinations of hardware and programming. Engines 121-123 may be implemented in a number of fashions. Referring to FIG. 3, the programming may be processor executable instructions 321-322 stored on a machine-readable storage medium 310 and the hardware may include a processor 311 for executing those instructions. Thus, machine-readable storage medium 310 can be said to store program instructions or code that when executed by processor 311 implements classification model system 110 of FIG. 1.

In FIG. 3, the executable program instructions in machine-readable storage medium 310 are depicted as binary code instructions 321 and classification model instructions 322. Instructions 321-322 represent program instructions that, when executed, cause processor 311 to implement engines 121-122, respectively.

Figure 4:
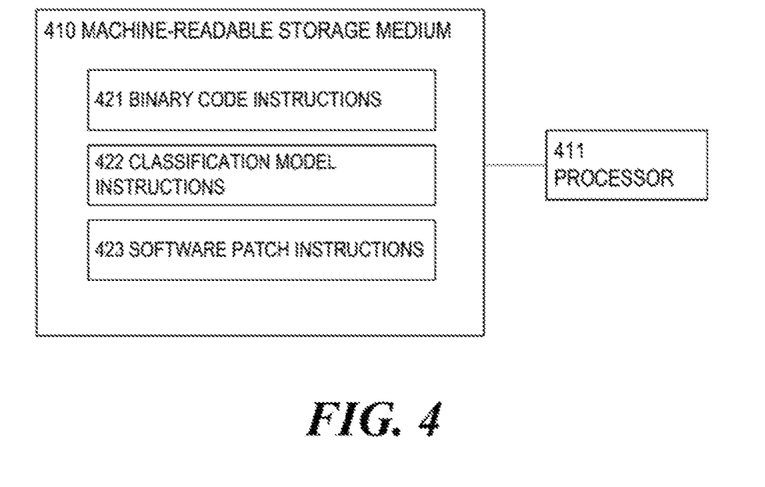
FIG. 4 is a block diagram depicting an example machine-readable storage medium comprising instructions executable by a processor for generating a classification model for binary code data.

FIG. 4 is a block diagram depicting an example machine-readable storage medium 410 comprising instructions executable by a processor for generating a classification model for binary code data.

Referring to FIG. 4, the programming may be processor executable instructions 421-423 stored on a machine-readable storage medium 410 and the hardware may include a processor 411 for executing those instructions. Thus, machine-readable storage medium 410 can be said to store program instructions or code that when executed by processor 411 implements classification model system 110 of FIG. 1.

In FIG. 4, the executable program instructions in machine-readable storage medium 410 are depicted as binary code instructions 421, classification model instructions 422, and software patch instructions 423. Instructions 421-423 represent program instructions that, when executed, cause processor 411 to implement engines 121-123, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement classification model system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-322, and/or other instructions. As an alternative or in addition to retrieving and executing instructions, processor 311 may include at least one electronic circuit comprising a number of electronic components for performing the functionality of at least one of instructions 321-322, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-423, and/or other instructions. As an alternative or n addition to retrieving and executing instructions, processor 411 may include at least one electronic circuit comprising a number of electronic components for performing the functionality of at least one of instructions 421-423, and/or other instructions.

Figure 5:
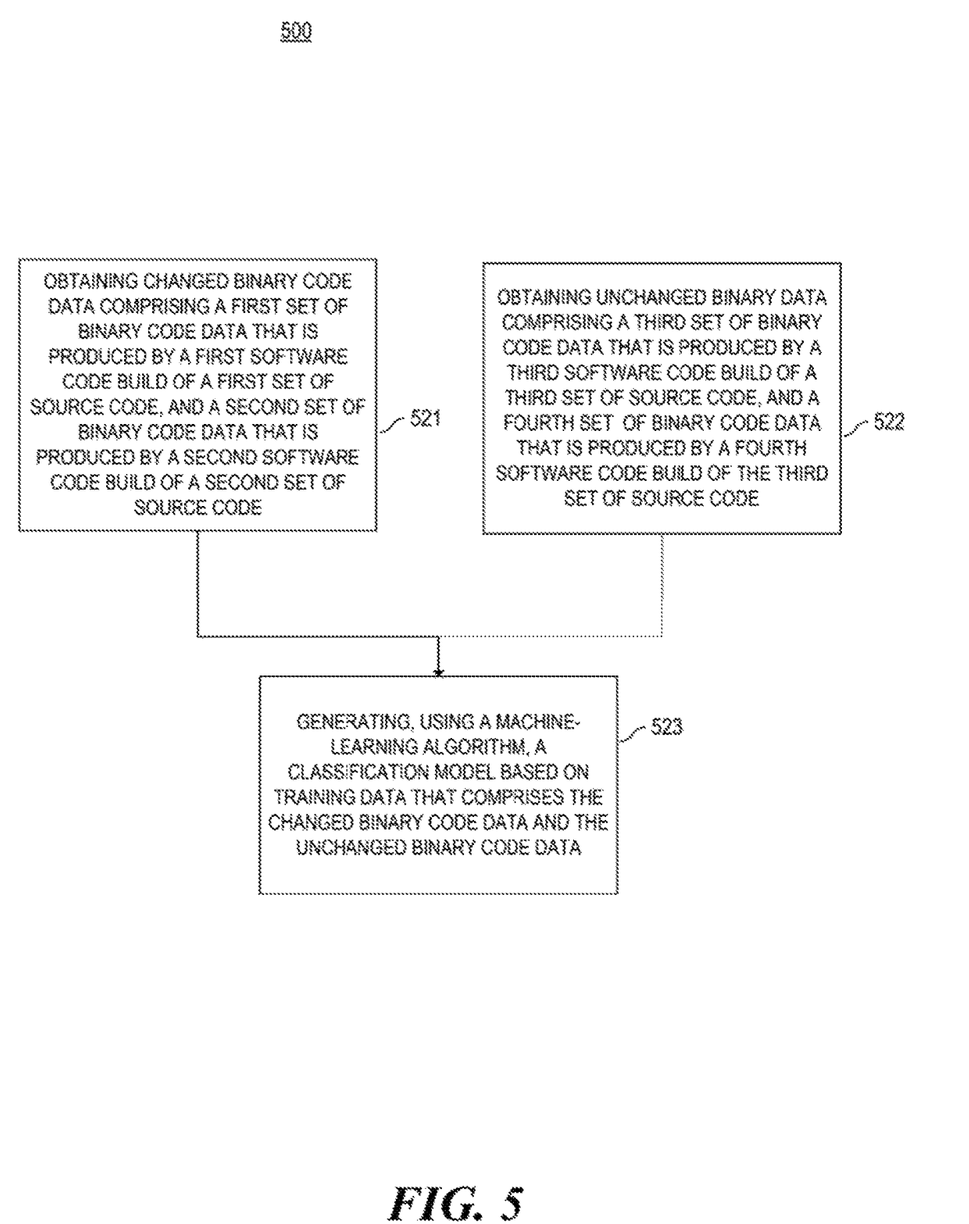
FIG. 5 is a flow diagram depicting an example method for generating a classification model for binary code data.

FIG. 5 is a flow diagram depicting an example method 500 for generating a classification model for binary code data. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining changed binary code data comprising a first set of binary code data that is produced by a first software code build of a first set of source code, and a second set of binary code data that is produced by a second software code build of a second set of source code. Referring back to FIG. 1, binary code engine 121 may be responsible for implementing block 521.

In block 522, method 500 may include obtaining unchanged binary data comprising a third set of binary code data that is produced by a third software code build of a third set of source code, and a fourth set of binary code data that is produced by a fourth software code build of the third set of source code. Referring back to FIG. 1, binary code engine 121 may be responsible for implementing block 522.

In block 523, method 500 may include generating, using a machine-learning algorithm, a classification model based on training data that comprises the changed binary code data and the unchanged binary code data. Referring back to FIG. 1, classification model engine 122 may be responsible for implementing block 523.

Figure 6:
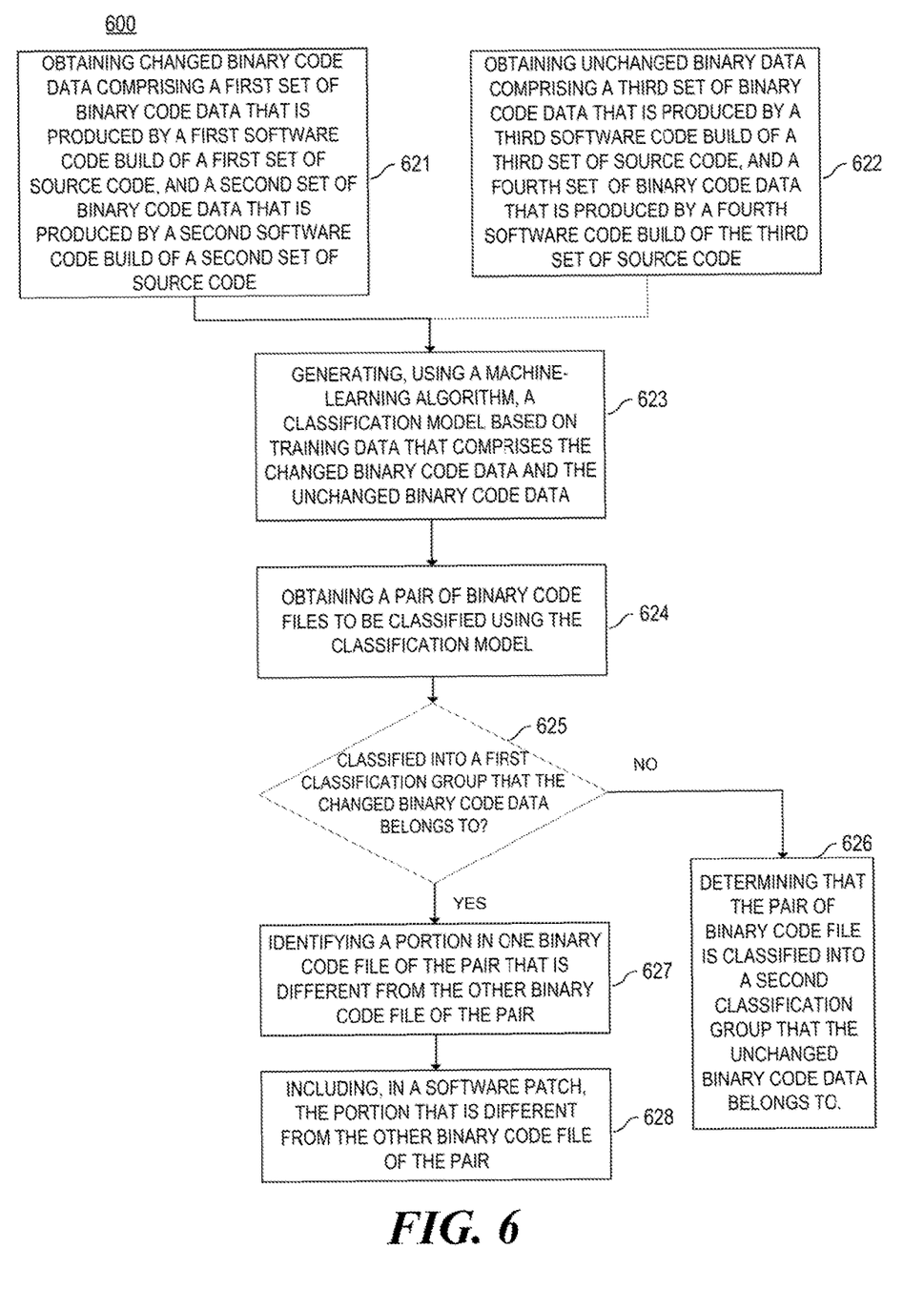
FIG. 6 is a flow diagram depicting an example method for generating a classification model for binary code data.

FIG. 6 is a flow diagram depicting an example method 600 for generating a classification model for binary code data. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include obtaining changed binary code data comprising a first set of binary code data that is produced by a first software code build of a first set of source code, and a second set of binary code data that is produced by a second software code build of a second set of source code. Referring back to FIG. 1, binary code engine 121 may be responsible for implementing block 621.

In block 622, method 600 may include obtaining unchanged binary data comprising a third set of binary code data that is produced by a third software code build of a third set of source code, and a fourth set of binary code data that is produced by a fourth software code build of the third set of source code. Referring back to FIG. 1, binary code engine 121 may be responsible for implementing block 622.

In block 623, method 600 may include generating, using a machine-learning algorithm, a classification model based on training data that comprises the changed binary code data and the unchanged binary code data. Referring back to FIG. 1, classification model engine 122 may be responsible for implementing block 623.

In block 624, method 600 may include obtaining a pair of binary code files to be classified using the classification model. Referring back to FIG. 1, classification model engine 122 may be responsible for implementing block 624.

In block 625, method 600 may include determining, using the classification model, whether the pair of binary code files is classified into a first classification group that the changed binary code data belongs to or a second classification group that the unchanged binary code data belongs to. Referring back to FIG. 1, classification model engine 122 may be responsible for implementing block 625.

In response to determining that the pair of binary code files is classified into the first classification group, method 600 may proceed to block 627. Otherwise, method 600 may proceed to block 626 in which method 600 determines that the pair of binary code file is classified into the second classification group. Referring back to FIG. 1, classification model engine 122 may be responsible for implementing block 626.

In block 627, method 600 may include identifying a portion in one binary code file of the pair that is different from the other binary code file of the pair. Referring back to FIG. 1, software patch engine 123 may be responsible for implementing block 627.

In block 628, method 600 may include including, in a software patch, the portion that is different from the other binary code file of the pair. Referring back to FIG. 1, software patch engine 123 may be responsible for implementing block 628.

The foregoing disclosure describes a number of example implementations for classification model for binary code data. The disclosed examples may include systems, devices, computer-readable storage media, and methods for classification model for binary code data. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
    obtaining, by a computer, changed binary code data comprising a first set of binary code data that is produced by a first software code build of a first set of source code, and a second set of binary code data that is produced by a second software code build of a second set of source code;
    obtaining, by the computer, unchanged binary code data comprising a third set of binary code data that is produced by a third software code build of a third set of source code, and a fourth set of binary code data that is produced by a fourth software code build of the third set of source code; and
    generating, by the computer, using a machine-learning algorithm, a machine learning classification model based on training data that comprises the changed binary code data and the unchanged binary code data, wherein the machine learning classification model is used by the machine-learning algorithm to classify whether a pair of binary code files comprising a first binary code file and a second binary code file belongs to a first classification or a second classification, the first classification designates the second binary code file as being changed relative to the first binary code file, the second classification designates the second binary code file as not being changed relative to the first binary code file, and the generating comprises training the machine learning classification model to classify the pair of binary code files as belonging to the second classification regardless of whether the second binary code file has changes relative to the first binary code file.

2. The method of claim 1, wherein the changed binary code data comprises a pair of a third binary code file from the first set of binary code data and a fourth binary code file from the second set of binary code data, and wherein the unchanged binary code data comprises a pair of a fifth binary code file from the third set of binary code data and a sixth binary code file from the fourth set of binary code data.

3. The method of claim 1, wherein the machine learning classification model is used to determine whether to generate a corresponding patch file representing a change in the second binary code file relative to the first binary code file.

4. The method of claim 1, further comprising:
identifying a portion of the second binary code file that is different from the first binary code file.

5. The method of claim 4, further comprising:
including the portion in a software patch.

6. The method of claim 1, wherein the second set of source code includes a portion that is different from the first set of source code.

7. A non-transitory machine-readable storage medium comprising instructions that, when executed by a processor of a computing device, cause the processor to:
identify a machine learning classification model that is generated based on training data comprising: (i) a first pair of binary code files produced by compiling a first pair of source code files that have a portion that is different from each other, and (ii) a second pair of binary code files produced by compiling a second pair of source code files that are identical;
obtain a third pair of binary code files to be classified using the machine learning classification model, wherein the third pair of binary code files comprises a first binary code file and a second binary code file; and
apply machine learning to determine, using the machine learning classification model, whether the third pair of binary code files is classified into a first classification group representing that the first binary code file is changed relative to the second binary code file or classified into a second classification group representing that the first binary code file is unchanged relative to the second binary code file, the second binary code file comprises changes relative to the first binary code file, and wherein application of the machine learning comprises classifying the third pair of binary code files into the second classification group.

8. The non-transitory machine-readable storage medium of claim 7, wherein the instructions, when executed by the processor, further cause the processor to:
in response to determining that a fourth of binary code files is classified into the first classification group, identify a portion of code that is different between the first binary code file and the second binary code file; and
include the portion in a software patch.

9. The non-transitory machine-readable storage medium of claim 7, wherein the instructions, when executed by the processor, further cause the processor to:
compare the first binary code file with the second binary code file; and
generate a particular vector to be placed in a vector space of the machine learning classification model, the particular vector representing a result of the comparison of the first binary code file with the second binary code file.

10. The non-transitory machine-readable storage medium of claim 8, wherein the second binary code file comprises a predetermined number of sections of equal byte size, and the instructions, when executed by the processor, further cause the processor to:
identify, for each section of the second binary code file, a portion of code that is different from the first binary code file;
determine a byte size of the portion that is different from the first binary code file; and
determine a percentage of the byte size of the portion in a total byte size of the each section of the second binary code file.

11. The non-transitory machine-readable storage medium of claim 8, wherein the machine learning classification model comprises a support vector machine (SVM) model having a vector space, the vector space comprises a first set of vectors corresponding to the first classification group and a second set of vectors corresponding to the second classification group, and the instructions, when executed by the processor, further cause the processor to:
in response to determining that a particular vector of the machine learning classification model belongs to the first set of vectors, determine that the third pair of binary code files is classified into the first classification group.

12. A system comprising:
a processor that:
obtains changed binary code data comprising a first set of binary code data that is produced by a first software code build of a first set of source code, and a second set of binary code data that is produced by a second software code build of a second set of source code;
obtains unchanged binary code data comprising a third set of binary code data that is produced by a third software code build of a third set of source code, and a fourth set of binary code data that is produced by a fourth software code build of the third set of source code;
generates, using a machine-learning algorithm, a machine learning classification model based on training data that comprises the changed binary code data and the unchanged binary code data;
applies the machine learning classification model to classify a pair of binary code files as belonging to either a first classification or a second classification, wherein the pair of binary code files comprises a first binary code file and a second binary code file, the second binary code file comprises changes relative to the first binary code file, the first classification represents that the second binary code file is changed relative to the first binary code file, the second classification represents that the second binary code file is not changed relative to the first binary code file, and wherein application of the machine learning classification model comprises classifying the pair of binary code files as belonging to the second classification; and
determines whether to include a portion of the pair of binary code files in a software patch based on whether the pair of binary code files is classified as belonging to the first classification or the second classification.

13. The system of claim 12, wherein application of the machine learning classification model comprises:
determining percentage differences of sections of the second binary code file relative to corresponding sections of the first binary code file.

14. The system of claim 12, wherein the processor:
identifies a portion of the second binary code file that is different from the first binary code file; and
in response to application of the machine learning classification model classifying the pair of binary code files as belonging to the first classification, includes the portion in the software patch.

15. The system of claim 12, wherein the processor:
determines a level of confidence in application of the machine learning classification model in classifying the pair of binary code files as belonging to the second classification;
compares the level of confidence with a threshold level; and
in response to determining that the level of confidence is below the threshold level, classifies the pair of binary code files as belonging to the first classification.

* * * * *